United States Patent [19]

Wernhart

[11] Patent Number: 4,570,854

[45] Date of Patent: Feb. 18, 1986

[54] AGRICULTURAL AERIAL WATER SPRAYER

[76] Inventor: Hans Wernhart, 12147 Pony Express La., Bakersfield, Calif. 93306

[21] Appl. No.: 594,213

[22] Filed: Mar. 28, 1984

[51] Int. Cl.$^4$ .............................................. B05B 3/18
[52] U.S. Cl. .................................. 239/189; 239/176; 239/280; 239/286
[58] Field of Search ........ 239/172, 176, 178, 189–192, 239/197–199, 280–281, 286, 587, 709; 169/25; 182/187

[56] References Cited

U.S. PATENT DOCUMENTS

| 221,401 | 11/1879 | Drake et al. | 169/25 |
| 1,714,713 | 5/1929 | Farley | 239/189 |
| 1,993,320 | 3/1935 | Dozier | 182/187 |
| 2,331,373 | 10/1943 | Campbell | 239/281 |
| 2,419,145 | 4/1947 | Kersenbrock et al. | 182/187 |
| 3,140,827 | 7/1964 | Fletcher | 239/178 |
| 3,445,066 | 5/1969 | Mohar | 239/189 |
| 3,507,336 | 4/1970 | Nelson | 239/191 |
| 3,628,731 | 12/1971 | Phillips | 239/189 |
| 4,174,809 | 11/1979 | Arlemark | 239/189 |

Primary Examiner—Jeffrey V. Nase
Assistant Examiner—James R. Moon, Jr.
Attorney, Agent, or Firm—Harlan P. Huebner

[57] ABSTRACT

An agricultural liquid spraying system including a liquid source and retrieval vehicle and a movable base member, the movable base member includes base mounted wheels, a liquid tower, a rotatable seat mounted on the tower, a rotatable nozzle mounted on the upper end of the tower, and a directional control arm secured to the nozzle for manipulation by a person located in the rotatable seat, the tower capable of being partially collapsed for transporting the movable base member.

3 Claims, 8 Drawing Figures

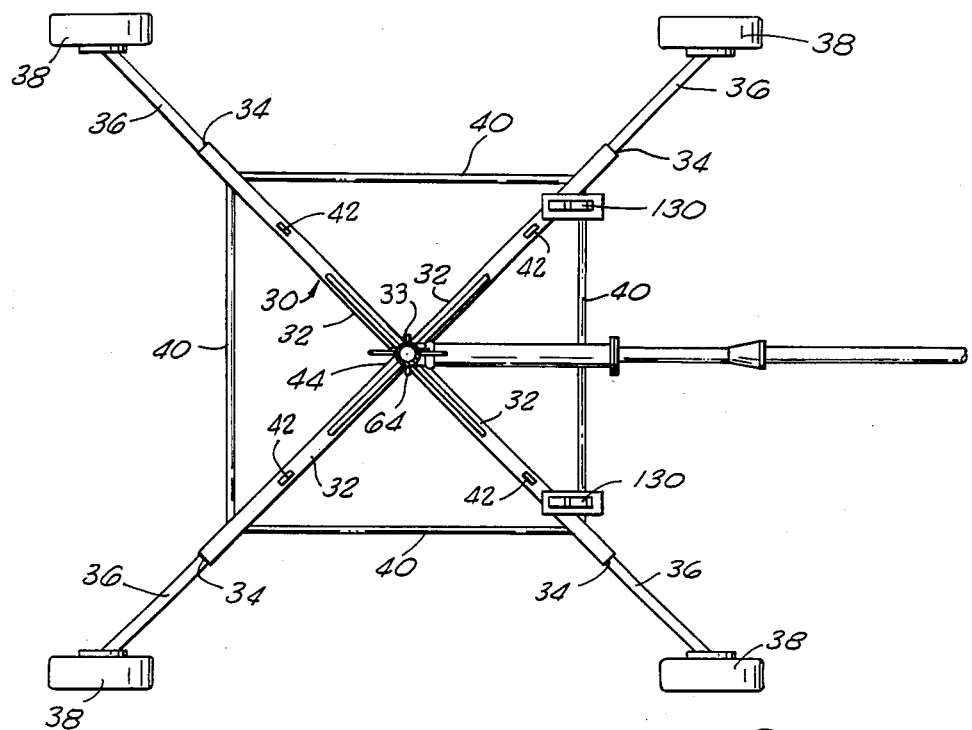
FIG. 4.
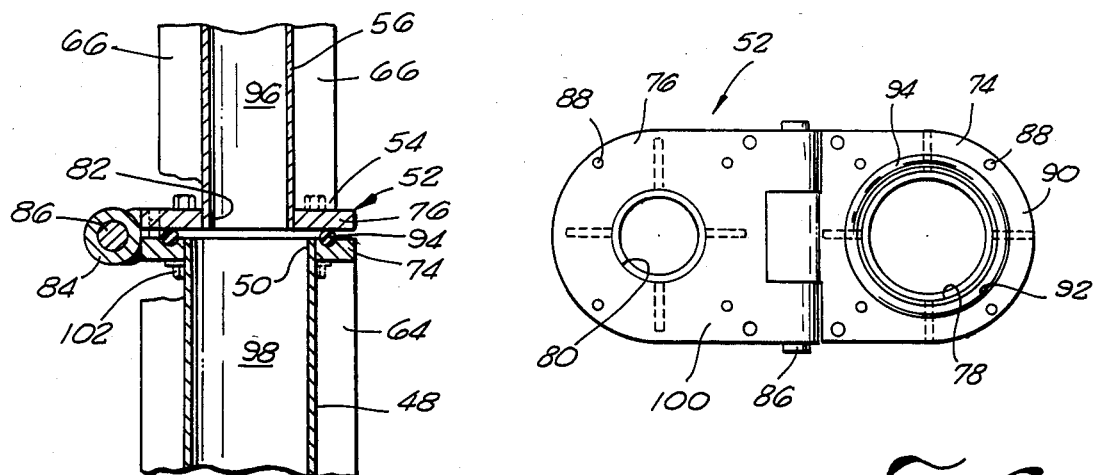
FIG. 5.
FIG. 6.

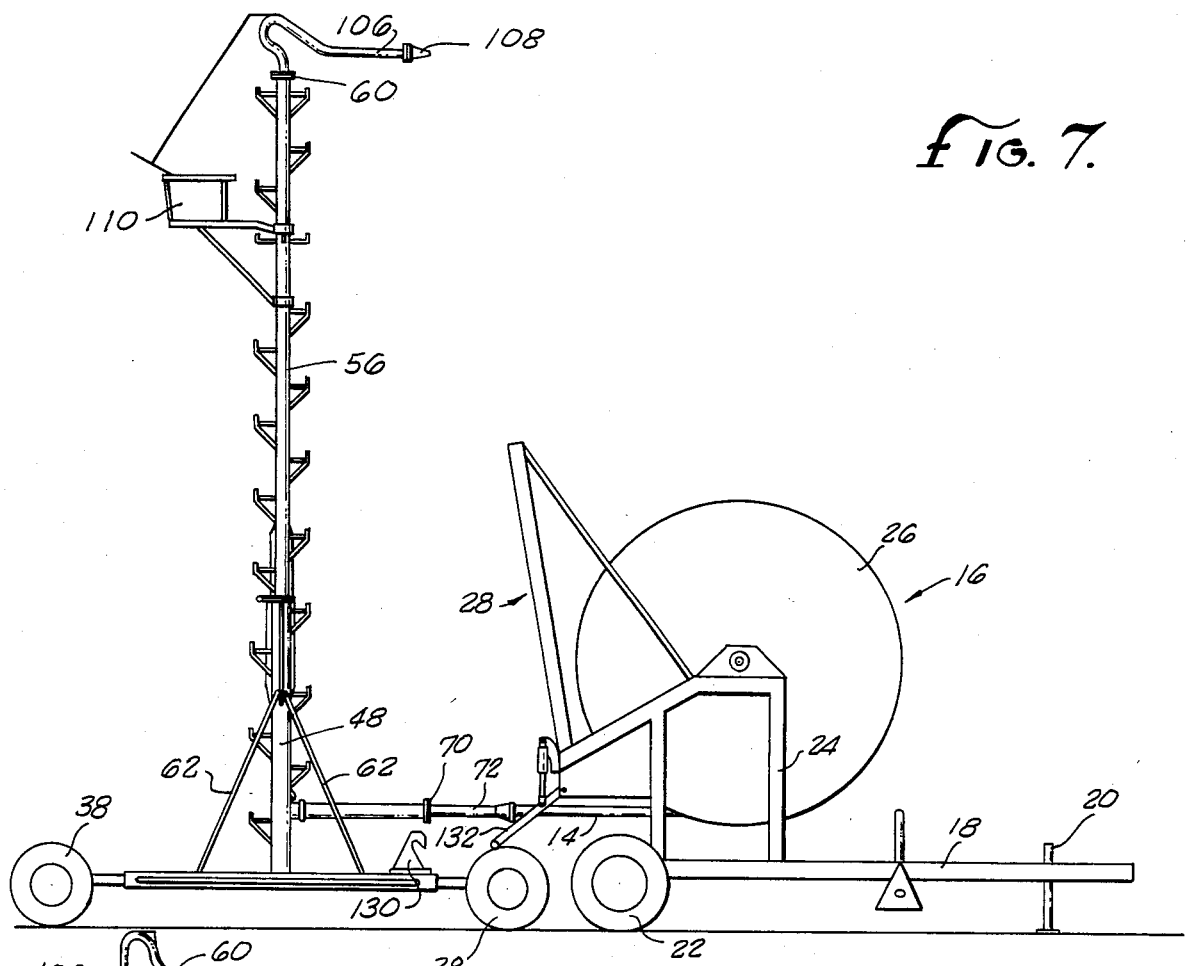
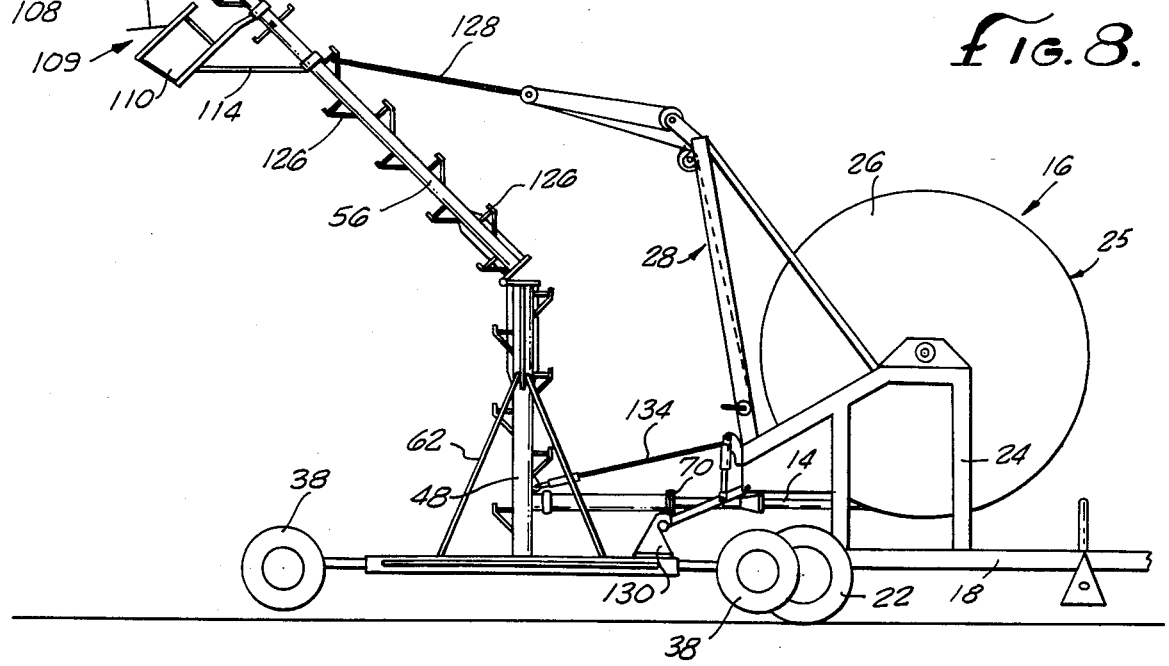

AGRICULTURAL AERIAL WATER SPRAYER

BACKGROUND OF THE INVENTION

1. Field of the Invention

The invention is in the field of agricultural liquid spraying particularly suited to the spraying of almond trees.

2. Description of the Prior Art

Movable water sprayers designed for use with fixed water source vehicles have been known in the past. In addition, reel type of water spray structures have been known. However, such structures have not proven adequate or satisfactory when it is necessary to spray large trees and particularly almonds to remove "mummies" or to remove dust and some pests at other times of the year. Example of the prior art patents are Farley—U.S. Pat. No. 1,714,713, Mohar—U.S. Pat. No. 3,445,066, Phillips—U.S. Pat. No. 3,628,731 and Arlemark—U.S. Pat. No. 4,174,809.

SUMMARY OF THE INVENTION

This invention is directed to an agricultural aerial water or other liquid sprayer for use with an exterior water source and reel vehicle. The sprayer is connected to a flexible water hose which can be moved down between rows of trees and as the sprayer sprays the trees it may be pulled along the rows back to the exterior water source and reel vehicle.

Another object of this invention is to provide a movable aerial water sprayer which includes a tower which can be collapsed when not in use so that the apparatus may be pulled along the highway.

A further object of the invention is to provide liquid spraying apparatus wherein there are means on the tower for a person whereby the direction of the spray of liquid may be more precisely controlled.

Another object of the invention is to provide liquid spraying apparatus which is lockable with an exterior water source and reel vehicle for simultaneous movement therewith from one field to another or along roadways.

A still further object of this invention is to provide an agricultural aerial apparatus to remove "mummies" from almond trees during the winter and in the summer may be used to wash almond trees to remove dust and certain pests.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

These advantages may be more fully understood from the following detailed description and by refercece to the drawings in which:

FIG. 4, is a view taken of lines 4—4 of FIG. 3;

FIG. 5, is a cross sectional view of the invention illustrating the hinge member whereby a portion of the aerial sprayer may be collapsed;

FIG. 6, is a detailed view of the hinge of FIG. 5 in open position;

FIG. 7, is a side elevational view of the aerial liquid sprayer adjacent a exterior water source and reel vehicle; and FIG. 8, illustrates the aerial liquid sprayer locked to the water source and reel vehicle for simultaneous movement therewith together with structure for collapsing or folding the tower section of the sprayer.

DETAILED DESCRIPTION OF THE PREFERRED EMBODIMENT

Figure 1:
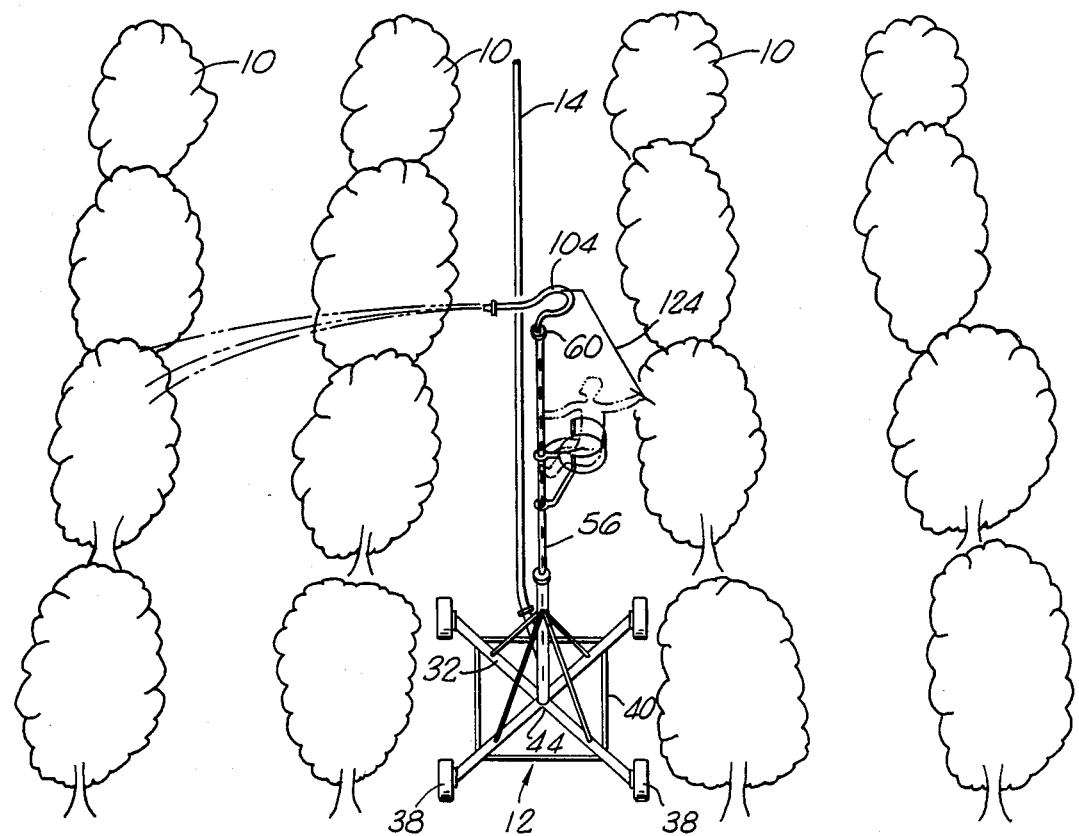
FIG. 1, is an aerial environmental view illustrating the agrucultural aerial liquid spray in position between rows of trees.
Figure 2:
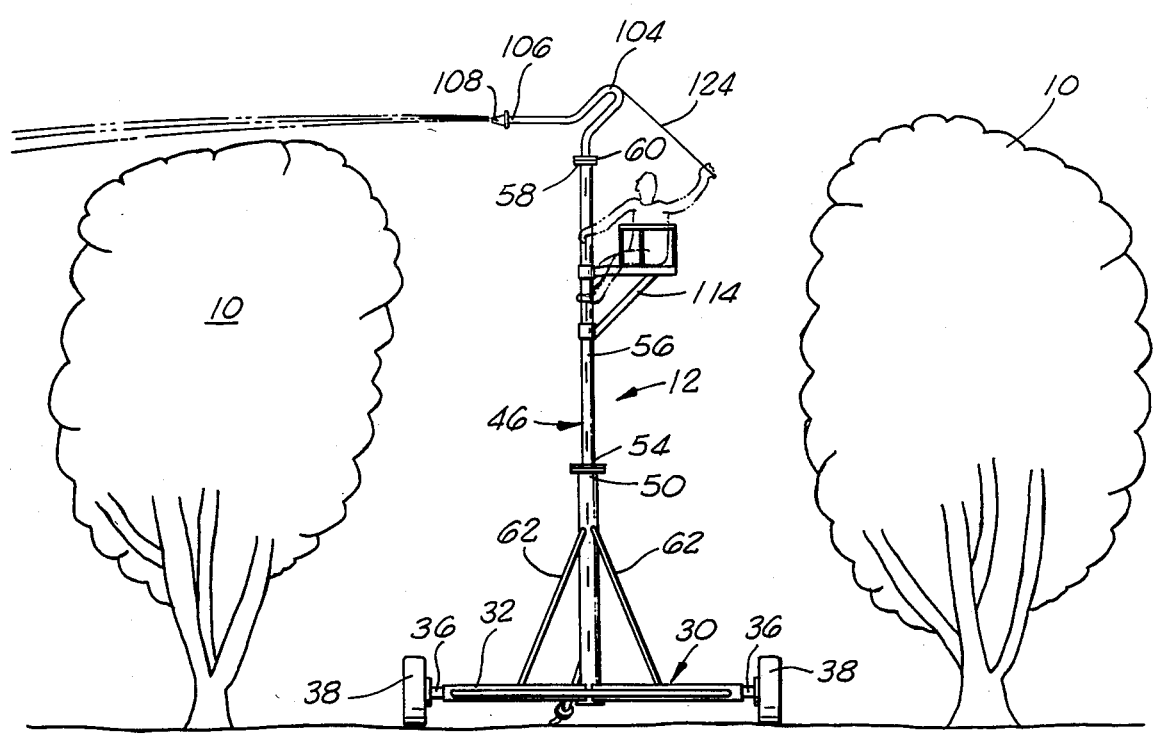
FIG. 2, is a front elevational environmental view of the agricultural aerial liquid sprayer.
Figure 3:
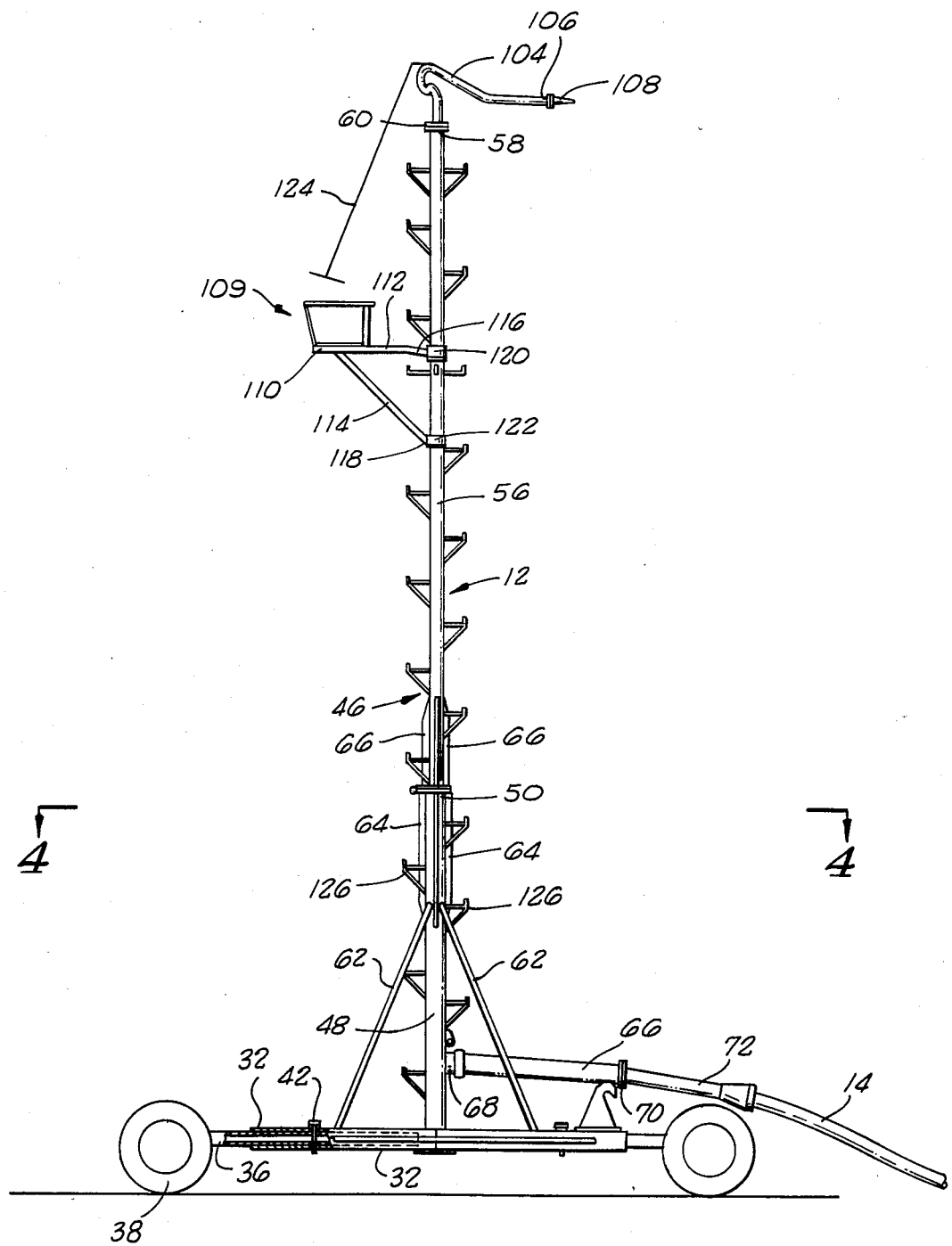
FIG. 3, is a side elevational view of the agricultrual aerial sprayer.

Referring to the drawings and particularly FIGS. 1, 2 and 3 there is illustrated a number of trees 10 to which it is desired that water be applied to the branches and leafs thereof. It will be noted that the trees 10 are arranged in typical rows and between each of the rows in agricultural aerial liquid sprayer generally designated 12 may move. The sprayer 12 is preferably tethered by being attached to a flexible water hose 14 which in turn passes along the rows of trees 10 to the end of the row where it is connected to a conventional water source and retrival vehicle 16, best seen in FIGS. 7 and 8. While water is the liquid for preferable use, it must be realized that liquid fertilizer and liquid pesticides may also be used with the sprayer 12 without departing from the spirit of the invention.

The water source and retrival vehicle 16 includes a frame member 18 which preferably has a front hitch for attachment to a truck or the like and a pair of rear wheels 22 whereby the vehicle 16 may be moved along roads, or from one field of agricultural products to another.

The frame member 18 preferably includes an upright reel supporting frame member 24. Cradled within the frame member 24 is a retrieval hose reel 26 upon which the hose 14 may be wound. By any conventional means the water source reel vehicle 16 is connected to a water source which is pumped into the reel and hose 14 for dispensing to the agricultural aerial water sprayer 12.

In order to rotate the retrieval reel 26 as well as pump the water, electrical or hydraulical equipment (not shown) may be provided.

In addition to the upright reel support frame 24 there is preferably attached thereto a crane 28, the details of which will be subsequently discussed.

The agricultural aerial liquid sprayer 12 preferably includes a frame member 30 that is generally X shaped, includes hollow arm members 32, and as can be seen from FIG. 4 these arm members 32 radiate outwardly from a center point 33. Telescopingly mounted within the ends 34 of the arm members 32 are adjustable axel portions 36. Secured to the end of each axel 36 is a conventional vehicle wheel 38. The adjustable axels 36 that are telescopingly mounted within the arm members 32 may be moved inwardly and outwardly from the arm members to vary the width of the sprayer 12 depending upon the space between the rows of trees 10. In order to reinforce the arm members 32 braces 40 may extend therebetween. To secure the adjustable axels 36 into the arm members 32, pins 42 may be inserted and the respective members locked together.

Rising from the arm members 32 at the center point 33 is a water tower generally designated 46. The tower 46 includes an upwardly projecting base pipe 48 which is secured to the crossed arm members by any conventional means. At the upper end 50 of the base pipe 48 there is provided hinge means generally designated 52 as best seen in FIGS. 5 and 6. Secured to the hinge means 52 at an end 54 is an upper water pipe 56. There is also provided at end 58 of pipe 56 a rotatable water nozzle mount 60.

The base pipe 48 is preferably provided with a plurality of braces 62 which extend upwardly from the respective arm members 32 and are welded or otherwise secured to the base pipe 48 to assure rigidity of the pipe. In addition, gussets or flange braces 64 are welded or otherwise secured radially around the pipe 48.

The upper water pipe 56 may also be provided with gussets or flange braces 66 extending form the hinge means 52 upwardly for a predetermined length.

The agricultural aerial water sprayer 12 may also include a water coupling member 66 having one end 68 fitted into and communicating with the interior of the base pipe 48. The other end 70 of the coupling is secured to a fitting 72 on the hose 14 whereby the hose 14 and coupling 66 are united.

The hinge means 52 includes a bottom hinge plate member 74 and an upper hinge plate member 76. The bottom hinge plate member 74 includes an annular opening 78, see FIG. 6, which fits over the end 50 of the pipe 48 and is welded or otherwise secured thereto. The upper hinge plate member 76 includes an annular opening 80 smaller in diameter than opening 78 and the end 82 is inserted therein and welded or otherwise secured thereto. Conventional hinge pin ears 84 are provided on each plate 74 and 76 to receive a hinge pin 86. Each of the hinge plates 74 and 76 are provided with a plurality of small bores 88 which are aligned when the hinge plates are in a closed condition as seen in FIG. 5. In addition, the top face 90 of the bottom hinge plate member 74 is provided with a annular groove 92 into which is seated an O ring washer 94 to prevent water or liquid leaks when the sprayer is being used.

When the tower 46 is in upright position for use, the bores 96 and 98 of the pipes 56 and 48 are aligned by the hinge means 52, such as seen in FIG. 5. The bottom face 100 of the upper hinge plate member 76 bears against the annular O ring to seal the base pipe 48 and upper pipe 56 together. To assure that the pipes will remain in the aligned extension position, nuts 102 may pass through the bores 88 to lock the hinge plates together such as shown in FIG. 5.

At the top 58 of the upper pipe 56 a conventional rotatable water nozzle mount 60 is inserted. The mount 60 is connected to water nozzle pipe 104 which may be bent to control the water pressure. At the end 106 of the water nozzle pipe 104 a conventional rotatable and removable water nozzle 108 is affixed. It is desirable to have the nozzle 108 threaded on to the end 106 of the pipe 104 so that it may be removed and replaced depending upon what strength or force of water is desired. In the case of almonds, after the crop is picked and during the winter season, some of the fruit which becomes known as "mummies" may become the breeding grounds of insects which can infect the new fruit. In this case the nozzle 108 must be of such a type to direct a very strong spray of water at the almond trees to knock and remove the mummies. However, in the summer, particularly in warm areas, it is necessary to spray the foliage of the almond trees to remove dust to assure the proper growth of the trees and in some cases to remove pests that have clung to the leaves. In such a case it is desirable to have a less forceful nozzle spray and a new gentle spray type of nozzel 108 is used.

One of the important advantages of the present invention is the ability to precisely control the direction of water or other liquid from the water nozzle 108 near top 58 of the tower 46. In order to accomplish this, there is provided a liquid directional flow control means 109 including a seat 110 which is secured to a generally horizontal brace 112 and downwardly extending diagonal brace 114 each of which have swivel collars 120 and 122 respectively which are welded or otherwise secured thereto and extend around the upper pipe 56. There are stop means on the pipe 56, not illustrated to prevent downward movement of the seat 110 on the pipe 56. The swivels 120 and 122 will allow the seat 110 to rotate 360° around the pipe 56. Extending downwardly from the nozzle water pipe 104 is a directional control arm 124.

As can be seen in FIGS. 1 and 2 a workman climbs up the water tower to the seat 110 by means of plurality of vertically spaced apart steps 126 which are welded or otherwise secured to water pipe 46. Because of the preferred length of the water pipe 46, the worker is elevated high enough in the grove of trees whereby he can direct the flow of water by means of direction control arm 124. In view of the fact that the water pressure is usually quite strong when attending to almond trees as previsouly discussed, the spray is not aimed at the row of trees directly adjacent the sprayer 12 but to trees in the next row, see FIG. 1. With the worker's vantage point from the seat 110 he may than direct the spray. When he desires to move the spray 180° from the position shown in FIGS. 1 and 2, he merely pushes against the nearest step 126 rotating the chair and himself around the vertical axis of the tower 124 and the water nozzle pipe 104 and water pipe 108 will rotate by means of the rotatable water nozzle mount 60.

This procedure of watering on either side of sprayer 12 will continue as the hose 14 is reeled inward to the vehicle 16 along the rows of trees 10. At the end of the row the vehicle 16 may be moved to the next space between the rows and the and the sparyer 12 is pulled by tractor or other vehicle from the vehicle 16 along the rows of trees to the end of the row remote from the vehicle 16 and the process of watering the trees and reeling in the sprayer 12 is repeated.

When the spraying has been completed and it is desired to move the sprayer 12 and vehicle 16 it may be desirable to collapse a portion of the tower 46 so that the equipment may be moved along roads that are crossed by a telephone lines, power wires or structures such as bridges. In order to accomplish the collapsing, the hinge means 52 are activated. Attention is directed to FIG. 8 to illustrate how the portion 56 of tower 46 is lowered. There the crane 28 of the vehicle 16 may be extended and a line 128 attached to the upper water pipe 56. The nuts 102 are removed from the hinge means 52 and the line 128 is played outwardly from the crane 28 in any conventional manner whereby the height of the tower is reduced to merely the height of the base pipe 48.

Once the tower has been collapsed to its travel condition, the sprayer 12 may be directly attached or connected to the water source and reel vehicle 16 for transportation. To accomplish this there are a pair of hook arm plates 130 mounted on the front arms 32. These plates 130 are hooked over the hydraulic operated toolbar 132 on vehicle 16 as can be seen in FIG. 7. As the sprayer 12 is pushed forward the toolbar 132 locks within the hook plates 130 and the bar 132 is raised whereby the wheels 38 of the sprayer 12 are lifted off the ground and sprayer means 12 being so elevated above the ground can be moved with the vehicle 16.

To ensure proper carriage of the sprayer 12 a brace member 134 may extend from the base pipe 48 to the frame 24 of the vehicle 16.

In addition to the lowering of the hinged tower 46 as previously stated, the hinge means 52 may be reversed whereby the upper portion 56 is lowered forwardly over the vehicle 16 for more compact storage. To accomplish this a hydraulic strut from the base pipe 48 to the upper portion 56 may be employed, and as the strut is bleed the portion 56 is lowered to the travel position.

The invention and its intended advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific forms shown or used as mentioned except as defined in the accompaning claims, wherein various portions have been separated for clarity and reading and not for emphasis.

I claim:

1. An agricultural aerial liquid spraying system comprising:
   a retrieval vehicle;
   a movable base member including wheels which are adjustable widthwise to move between rows of agricultural products;
   a relatively long fixed length tower having an interior bore running on the vertical axis of said tower from and including an end connected to said base member and said tower terminating in an upper end remote said base member, said tower being pivotable from an operating vertical position to a generally horizontal transporting position;
   a nozzle means rotatably mounted on said upper end of said tower for dispensing liquid generally normal to said vertical position;
   liquid directional flow control means including a seat vertically fixably mounted upon said tower in the vicinity of said nozzle, said seat being rotatable around said tower and said seat adapted to hold a person elevated near said upper end; and
   a directional control arm secured to said nozzle means and extending downward terminating near said seat for manipulating by said person about the axis of said tower; and
   coupling means uniting said vehicle with said tower whereby liquid may pass from said vehicle to said interior bore of said tower for presentation to said nozzle means for discharge therefrom and whereby said movable base member may be retrieved to said vehicle.

2. An agricultural aerial liquid spraying system as defined in claim 1 including:
   hinge elements interposed in said tower to break said tower and allow a portion thereof to pivot normal to the vertical axis of said tower.

3. An agricultural aerial liquid spraying system as defined in claim 1 wherein said movable base member includes:
   telescoping arms interfitted into said base for movement toward and away from said base;
   said wheels fitted to said telescoping arms to allow said movable base member to move with respect to said retrieval vehicle.

* * * * *